(12) United States Patent
Cormack

(10) Patent No.: US 6,597,829 B2
(45) Date of Patent: Jul. 22, 2003

(54) 1XN OPTICAL FIBER SWITCH

(76) Inventor: Robert H. Cormack, 5305 Holmes Pl., Boulder, CO (US) 80303

( * ) Notice: Subject to any disclaimer, the term of this patent is extended or adjusted under 35 U.S.C. 154(b) by 33 days.

(21) Appl. No.: 09/844,796

(22) Filed: Apr. 27, 2001

(65) Prior Publication Data
US 2002/0159685 A1 Oct. 31, 2002

(51) Int. Cl.[7] .................................................. G02B 6/26
(52) U.S. Cl. .............................. 385/22; 385/15; 385/16; 385/25; 385/33; 385/52
(58) Field of Search ......................... 385/22, 25, 33, 385/52, 15, 16, 17, 18

(56) References Cited

U.S. PATENT DOCUMENTS 4,611,885 A * 9/1986 Boirat ........................ 385/22
4,676,455 A * 6/1987 Diehl et al. ................ 244/3.13
6,292,310 B1 * 9/2001 Chao ......................... 359/813
6,295,171 B1 * 9/2001 Chao et al. ................. 359/813
6,320,988 B1 * 11/2001 Yamaguchi et al. ........ 382/276
6,342,945 B1 * 1/2002 Allen et al. ................ 356/73.1
6,415,069 B1 * 7/2002 Chao et al. .................. 385/16

* cited by examiner

Primary Examiner—Brian Healy
(74) Attorney, Agent, or Firm—Jennifer L. Bales; Machekedt Bales LLP

(57) ABSTRACT

A 1×N optical switch according to the present invention switches between output fibers without the need for active alignment by utilizing two beam deflecting stages, for example first passing the input beam through a translating element and then through a beam angle adjusting element. The translating element directs the input beam toward the selected fiber, and the angle adjusting element directs the beam toward the core of the selected fiber.

18 Claims, 5 Drawing Sheets

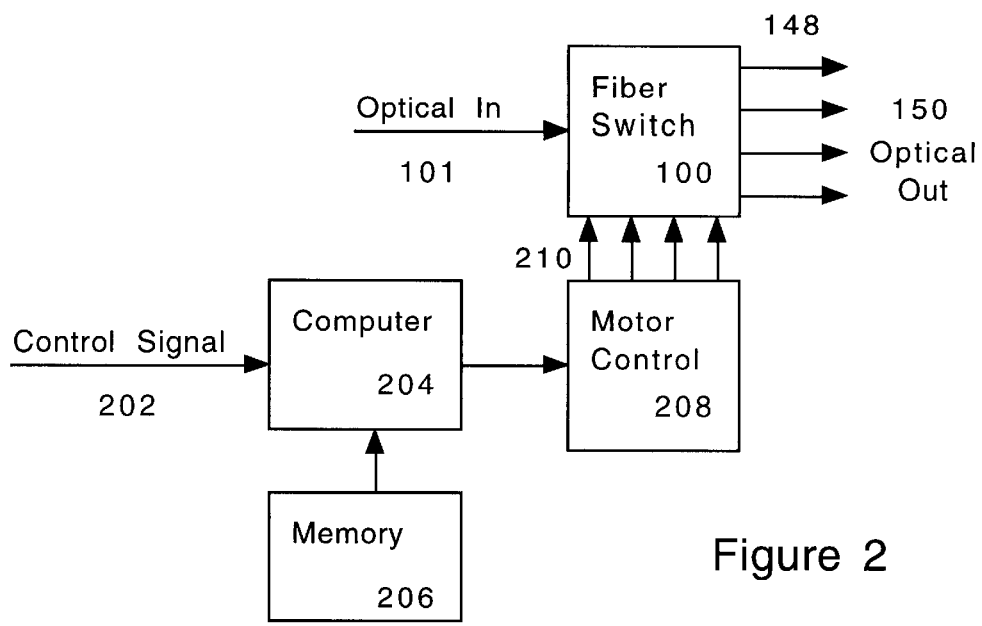
Figure 2
Figure 3a
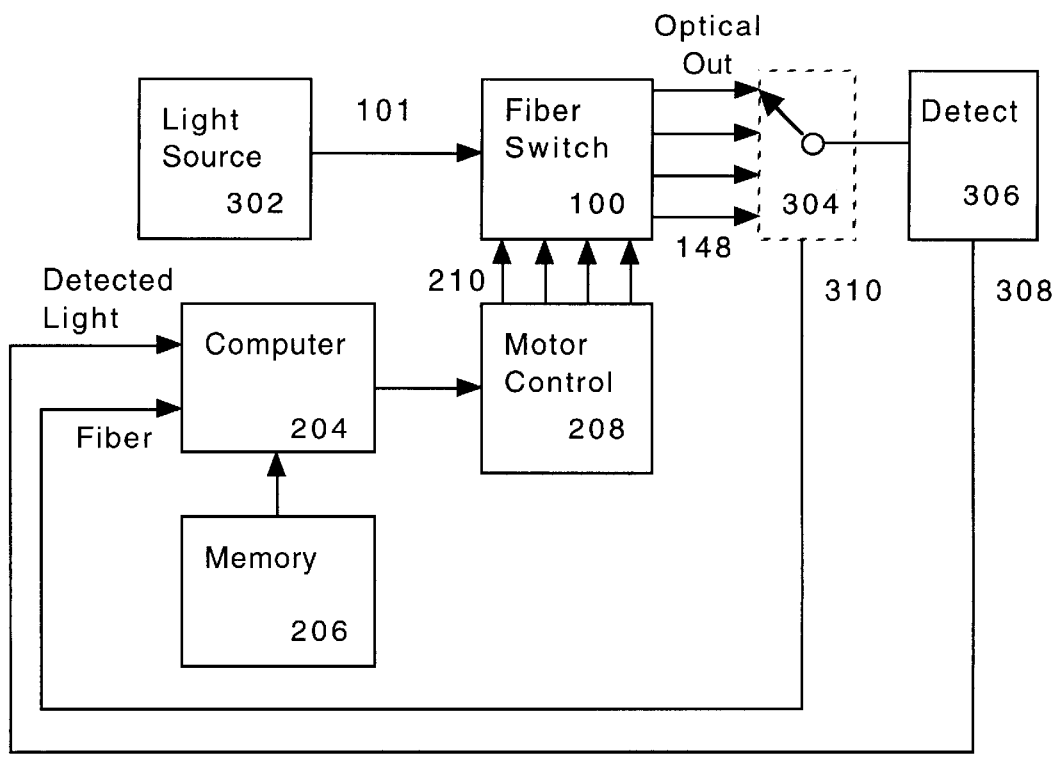

Beam Translation Assembly 503

Beam Angle Adjuster 529

552

1×N OPTICAL FIBER SWITCH

BACKGROUND OF THE INVENTION

1. Field of the Invention

The present invention relates to apparatus and methods for coupling an input optical fiber selectively to one of a plurality of output fibers. In particular, the present invention is a 1×N fiber switch.

2. Description of the Prior Art

Currently, there are a number of ways to implement fiber-to-fiber switches, where an input optical fiber is coupled selectively to one of a plurality of output fibers. A first method involves bringing the cut and polished surface of the input fiber into close proximity to the similarly cut and polished end of the desired output fiber. If the fibers' cores (where the light is guided) are positioned closely and accurately enough, most of the light from the input fiber will enter the core of the output fiber. This kind of switch requires accurate positioning of the fibers to a fraction of a micron, if low losses and achievability are to be accomplished.

A second switching method involves collimating the light from the input fiber using a lens. The collimated beam is then reflected into a collimator and hence directed into the desired output fiber using a movable mirror. Each output fiber has its own collimator. This type of switch requires each output fiber-collimator to be aligned to a very small fraction of a degree in order to maintain sufficiently low-loss coupling. In addition, the mirrors must accurately reproduce the same output beam angle for each output fiber.

A third type of switch involves passing the light from the input fiber through an interferometer with two possible outputs, such as a Mach-Zender interferometer. By manipulating the path length of one arm of the interferometer, the input light is directed to either of the two possible outputs. Free-space or fiber interferometers are expensive and must remain stable to a small fraction of a wavelength. Waveguide interferometers require very accurately positioned couplers in order to efficiently couple light from fibers to the waveguide switch and back to the fiber.

To summarize, all of the known 1×N switching methods require high precision alignment of a number of their optical components. When such switches are to be used with single mode fibers, as are used in optical networking, the required precision of the switch components exceed the accuracy achieved by normal manufacturing processes. Therefore, expensive and time consuming active alignment is required for each output fiber, often in several stages.

A need remains in the art for a 1×N optical fiber switch which does not require active alignment steps for each output fiber.

SUMMARY OF THE INVENTION

An object of the invention is to provide 1×N optical fiber switches which do not require active alignment steps for each output fiber. A 1×N optical switch according to the present invention switches between output fibers by utilizing two beam deflecting elements, for example first passing the input beam through a translating element and then through a beam angle adjusting element. The translating element directs the input beam toward the selected fiber, and the angle adjusting element directs the beam toward the core of the selected fiber. Alternatively, both of the deflecting elements could be angle adjusting elements, or the first element could be an angle adjusting element and the second element a translation element.

The translation element preferably includes beam translating block comprising a plane parallel block of an optical material, such as glass. A perpendicular rotating motor rotates the block about an axis perpendicular to the input beam direction. A gimbal ring and axial motor rotate the block and perpendicular motor about the longitudinal axis of the switch. The effect of the Beam Translator, when correctly positioned by the two motors, is to cause the input beam to be translated to a selected off-axis position.

The angle adjusting element preferably comprises two wedge prisms (for example Risley prisms) and associated motors. Each prism is independently rotated by its motor. The prisms change the angle of an incident light beam. Thus, by adjusting each prism appropriately, the input beam can be deflected in any direction and at any angle from 0° up to twice the angle achievable by each prism alone. The angle adjusting element could also be an adjustable liquid prism.

BRIEF DESCRIPTION OF THE DRAWINGS

FIG. 2 is a block diagram showing the switch of FIG. 1 used with a control system.

FIG. 3a is a block diagram and FIG. 3b is an associated flow diagram showing how the system of FIG. 2 is initially calibrated.

FIG. 5b is a block diagram illustrating an alternative scanning element for use in the embodiment of FIG. 5a.

DETAILED DESCRIPTION OF THE PREFERRED EMBODIMENTS

The present invention relates to apparatus and methods for coupling an input optical fiber selectively to one of a plurality of output fibers. A 1×N optical switch according to the present invention switches between output fibers using two beam deflecting elements in series. For example, the input beam may be first passed through a translating element and then through a beam angle adjusting element.

Figure 1:
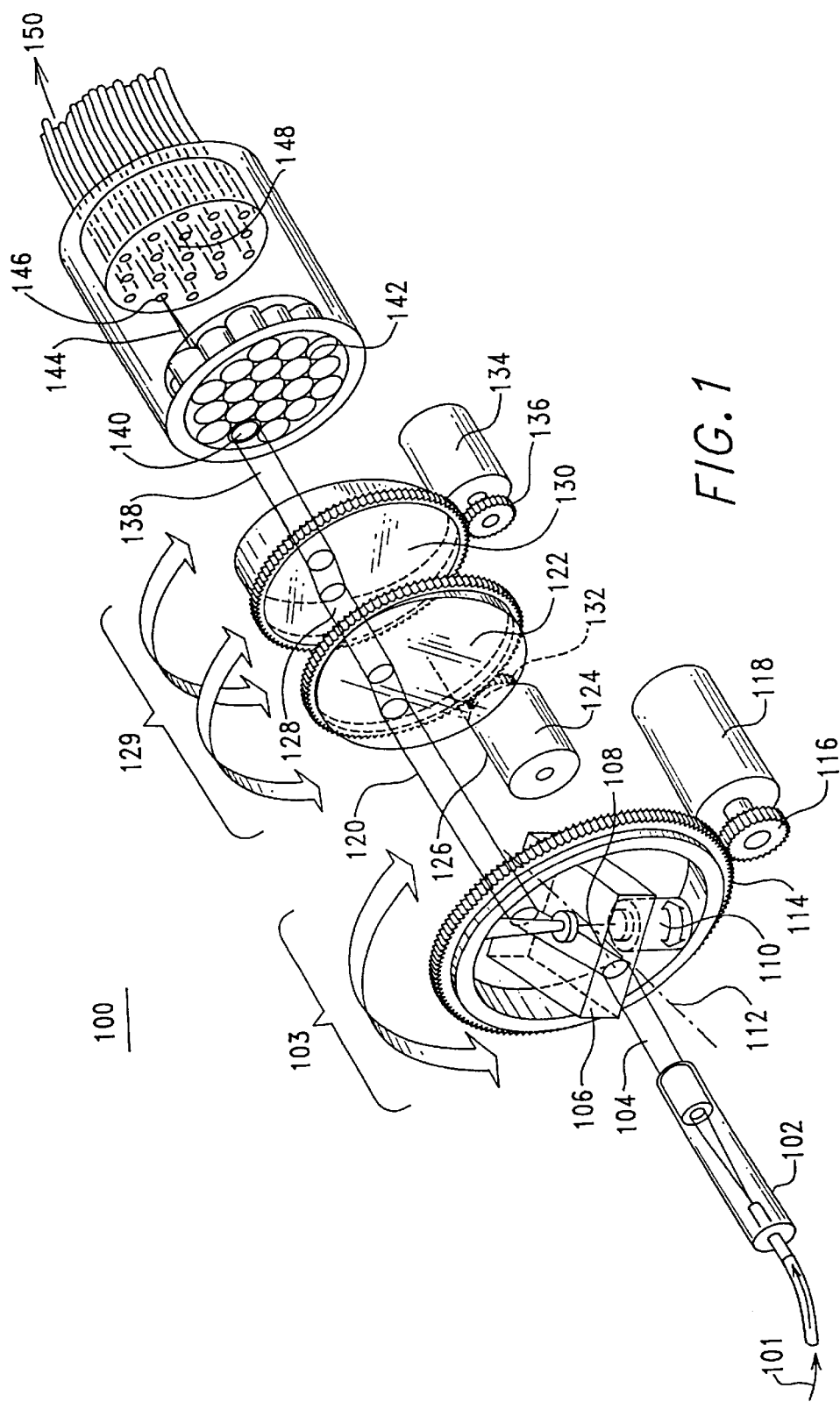
FIG. 1 is a side isometric view showing the preferred embodiment of a 1×N switch according to the present invention.

FIG. 1 shows the preferred embodiment of a 1×N switch 100 according to the present invention. Collimator 102 collimates the input light 101 into input beam 104. Input beam 104 next encounters beam translator 103. Beam translator 103 includes a beam translating block 106, comprising a plane parallel block of an optical material, such as glass, having a different index of refraction than the surrounding medium. Beam translating block 106, then, translates input beam 104, without changing its angle.

Beam translator 103 further includes perpendicular rotating motor 110. Beam translating block 106 is mounted so as to be rotatable about an axis 108 perpendicular to the beam direction by perpendicular rotating motor 110.

Beam translator 103 further includes gimbal ring 114 and motor 118. Perpendicular rotating motor 110 and block 106 are mounted on gimbal ring 114, so as to be rotatable about the longitudinal axis 112 of the switch. Axial motor 118 accomplishes this gimbal rotation via cog 116 engaged with gimbal ring 114.

The effect of Beam Translator 103, when positioned by motors 110, 188, is to cause the input beam 104 to be translated to a selected off-axis position, emerging as off-axis beam 120. Generally, Beam Translator 103 can be adjusted accurately enough that input beam 104 would hit the lens 140 associated with the selected fiber 146. The next stage fine tunes the direction of beam 120, such that the resulting beam 144 is focused on the core of selected fiber 146.

Translated beam 120 then encounters Beam Deflector 129, comprising first wedge prism 122, second wedge prism 130 and associated motors 124, 134. Wedge prisms 122, 130 are coupled to cogs 132, 136 driven by motors 124, 134. Each prism 122, 130 is independently rotated. A set of shallow, rotatable prisms in series, are commonly referred to as Risley prisms.

Prisms 122, 130 are preferably shallow angle prisms designed to change the angle of, or deflect, an incident light beam. Thus, prism 122 deflects beam 120, resulting in beam 128. Prism 130 deflects beam 128, resulting in beam 138. Each prism deflects its input beam a small amount (for example, 1 degree), in a direction determined by its rotational position. Thus, by adjusting each prism 122, 130, appropriately, the input beam can be deflected in any direction and at any angle from 0° to 2° (in this example).

Output beam 138 next encounters lens 140 of lens array 142. Lens array 142 comprises an array of lenses, each lens associated with a fiber within fiber array 148. So, for example, a beam impinging on lens 140 is focussed 144 onto fiber 146, resulting in output beam 150. Each associated lens (such as 140) and fiber (such as 146) constitutes an effective collimator with an effective acceptance angle for incoming light.

To summarize, input beam 104 can be coupled to any fiber in fiber array 148 with the following steps:

(1) Beam translator 103 is rotated to apply a translation to beam 104, resulting in translated beam 120. Beam Translator 103 can be adjusted accurately enough that input beam 104 would hit lens 140 associated with selected fiber 146.

(2) Beam Deflector 129 adjust the angle of input beam 120, resulting in output beam 138. Beam Deflector 129 fine tunes the direction of beam 120, such that the resulting beam 144 out of lens 140 is focussed on the core of selected fiber 146.

Switch 100 can be assembled using normal mechanical fixturing. Beam Translator 103 accepts the normal range of pointing directions of input beam 104. Beam Translator 103 can adjust enough to translate input beam 104 far enough to hit any of the lenses in lens array 142. Beam Translator 103 can be controlled with normal precision devices, motors, etc.

Beam deflector 129 is designed to have enough deflection range to allow coupling of beam 138 to any the desired output fiber, despite the normal range of acceptance angle variation of the output lens array to output fiber array. Beam Deflector 129 is capable of highly sensitive angular deflection, due to the use of a very slowly varying device (the Risley prisms 122, 130). Standard motors, such as stepper motors, have adequate precision to make the required adjustments.

Hence, switch 100 can efficiently couple the input light to any of the output fibers by setting Beam Translator 103 and fine tuning with Beam Deflector 129. No active alignment procedures are required in the construction of switch 100.

Two alternative embodiments of filter 100 also exist. See FIGS. 4a and 4b. Element 103 could be an angle deflecting element, and element 129 an angle deflecting element. Or, element 103 could be an angle deflecting element, and element 129 a translating element.

FIG. 2 is a block diagram showing switch 100 of FIG. 1 used with a control system for selecting an output fiber. Input beam 101 is selectively coupled to a desired output put fiber, resulting in output beam 150 by switch 100.

Control signal 202, specifying the desired output fiber, is sent to the switch's embedded computer 204. Computer 204 looks up motor settings in memory 206 to accomplish the requested coupling. Computer 204 then sends commands to motor controller 208 to accomplish the correct motor settings. Motor controller 208 accomplishes the motor setting and controls the coupling by controlling motors 110, 118, 124, and 134 (see FIG. 1) via control signals 210.

Figure 3B:
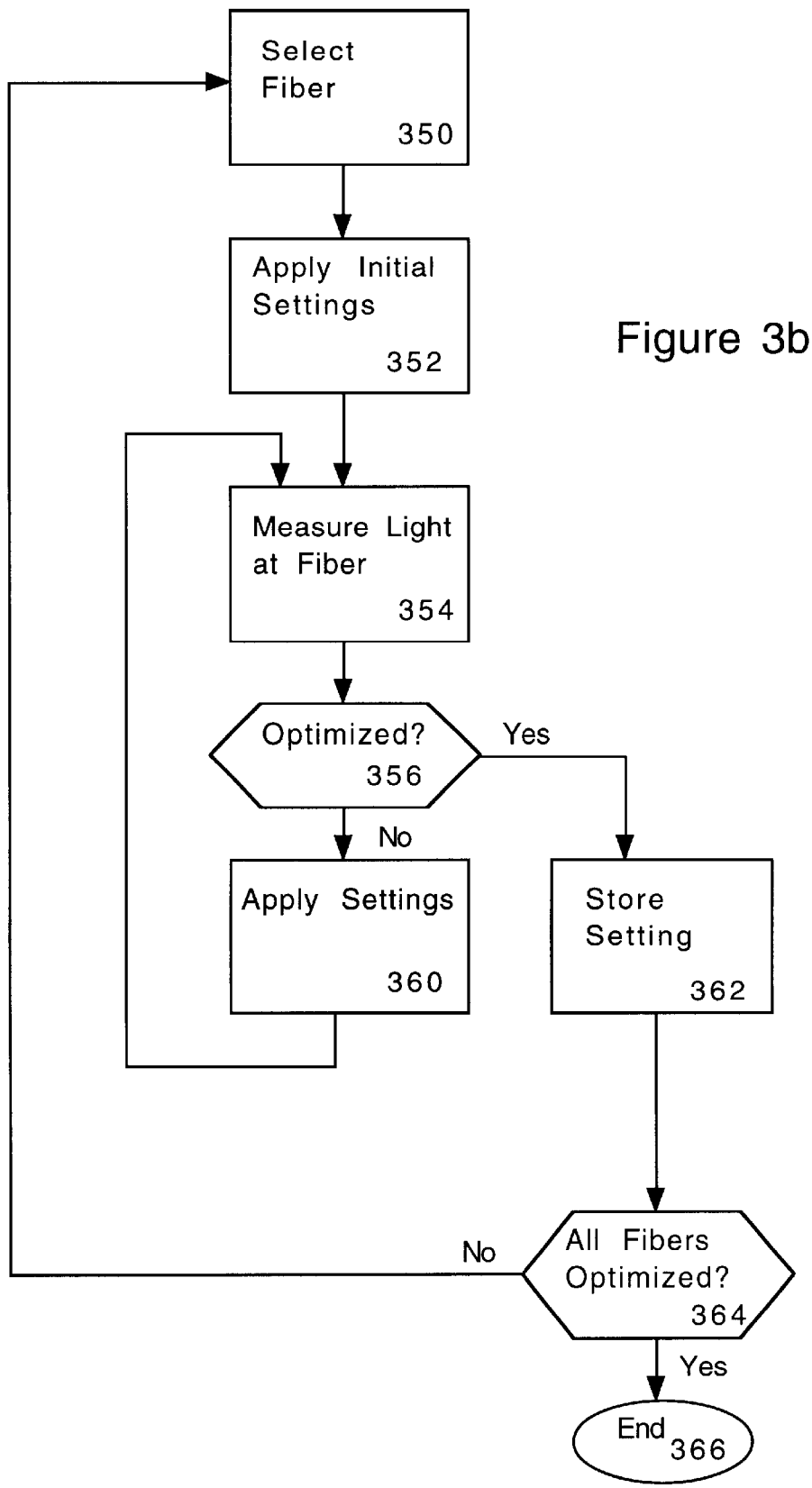

FIG. 3a is a block diagram and FIG. 3b is an associated flow diagram showing how the system of FIG. 2 is initially calibrated. A calibration light source 302 temporarily provides input light 101. A detector 306 is connected to switch 304, which selects each output fiber in turn. Computer 204 receives two signals during calibration: switch signal 310, which indicates which fiber is currently selected, and detector signal 208 which indicates how much light is being detected from the selected fiber.

In step 350, an output fiber for coupling is selected. Computer 204 preferably sets the motor switches to initial settings in step 352, which direct the input beam as close as possible to the selected output beam. The initial settings may be stored in the computer itself or in memory 206. These initial settings may be computed or obtained experimentally. Detector 306 measures the light produced at these settings in step 354, and generates signal 308, which is related to the amount of light detected. Next, computer 204 runs a conventional search algorithm and adjusts the motors (via motor controller 208) to maximize the detector signal. Step 356 determines whether the setting are maximized. If not, the settings are adjusted in step 360, and process returns to step 354. When the detector signal is maximized, the desired coupling is accomplished. The settings of the motors at that time are the settings to couple the selected output fiber in the future. Computer 204 stores the new, optimized settings for that output fiber in memory 206 in step 362. This process is repeated for each output fiber, until optimized motor setting for each output fiber coupling are stored. Step 364 determines whether settings for all fiber couplings have been stored. If so, process ends at step 366. If not, process returns to step 350, and the next fiber is selected.

Figure 4A:
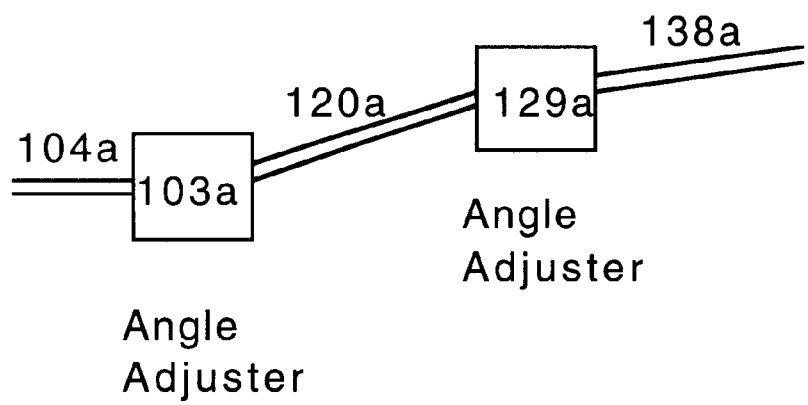
FIG. 4a is a block diagram illustrating a second embodiment and 4b is a block diagram illustrating a third embodiment of switch 100.
Figure 4B:
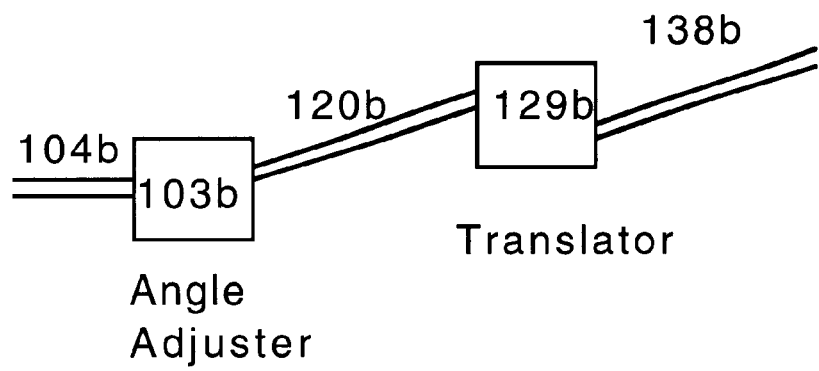

FIGS. 4a and 4b illustrate two alternative embodiments of switch 100. In FIG. 4a, element 103a is an angle deflecting element, and element 129a is also an angle deflecting element. In FIG. 4b, element 103b is an angle deflecting element, and element 129b is a translating element.

Figure 5A:
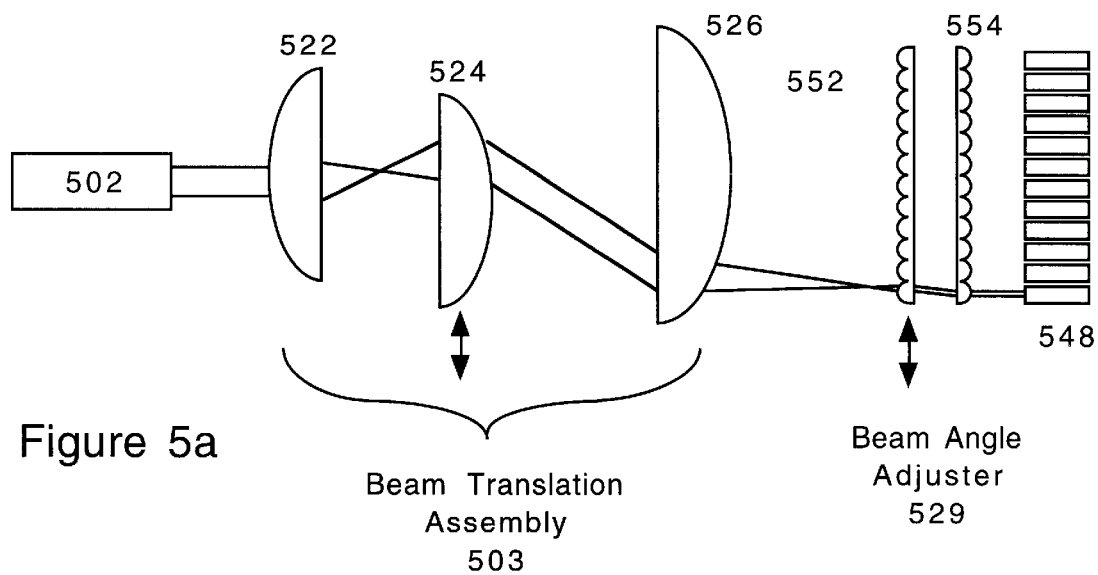
FIG. 5a is a block diagram illustrating a fourth embodiment of switch 100.

FIG. 5a is a block diagram illustrating a fourth embodiment of filter 100. The embodiment of FIG. 5 has the advantage of faster switching than the other embodiments. The main disadvantage of this embodiment is that the lenses must be highly designed and well fabricated. Losses are greater than in the other embodiments as well.

Figure 5B:
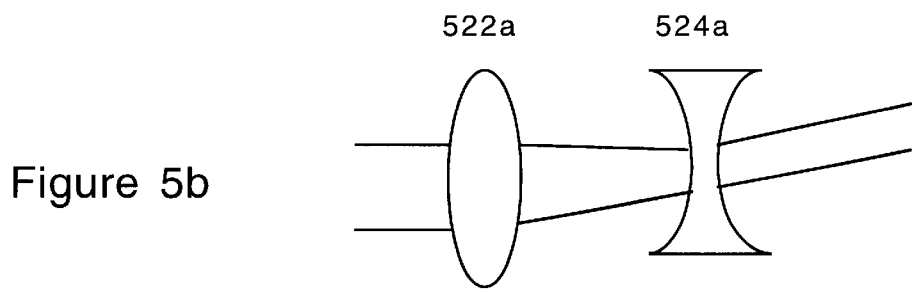

Lens 522 and lens 524 constitute a high speed beam scanner for input beam 504 from collimator 502. When lens 524 is translated in a plane perpendicular to the optic axis, the output beam direction is changed. By proper choice of lenses, the beam direction can be changed many degrees for a small translation of lens 524. While lenses 522 and 524 are positive lenses arranged afocally, those skilled in the art will appreciate that other combinations of lenses may be used. An example is shown in FIG. 5b.

Lens 526, preferably located one of its focal lengths away from lens 524, serves to redirect the angled beam parallel to the optic axis again. Thus, lenses 522, 524, and 526 constitute a beam translation assembly 503. However, the output beam from lens 526 is not a parallel beam, but rather comes to a focal point one focal length beyond lens 526.

Figure 5C:
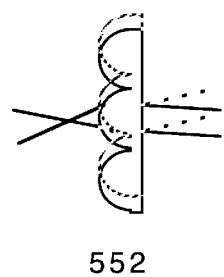
FIG. 5c is a block diagram illustrating a portion of the beam angle adjuster of FIG. 5a in more detail.

Lens array 552 is located past one focal length from lens 526 such that the beam is recollimated after passing through lens array 552. Thus, lens array is located one focal length (of the lenslets) beyond the focal point after lens 526. Lens array 552 is structured to translate as shown in FIG. 5c. A very small translation of lens array 552 causes the output beam direction to change substantially.

Lens array 554 is fixed with respect to output fiber array 548. Its purpose is to collimate the beam from array 552 and transmit it to fiber array 548. As an alternative, lens array 554 could be replaced with an array of collimators. Lens arrays 552 and 554 constitute angle adjuster 529.

Thus, by proper translation of lens 524 and array 552, input beam 504 can be translated to the appropriate output collimator lens in array 554 and its angle can be adjusted to maximise coupling with the associated fiber. Since the required motion of the two elements is very small (on the order of less than a millimeter), the switch operates very fast (on the order of a few milliseconds). As with the other embodiments, no active alignment is required.

FIG. 5b is a block diagram illustrating an alternative scanning element for use in the embodiment of FIG. 5a. Lens 522a is a positive lens and lens 524a is a negative lens.

FIG. 5c is a block diagram illustrating lens array 552 in more detail. The solid line indicate the path of the beam in a first position and the dotted lines indicate the path of the beam in a second position. Note that lens array 552 can have any number of lenslets. Even one lens may comprise the array, though it would require a larger amount of translation.

Those skilled in the art will also appreciate other variations in the present invention that are not specifically shown in a drawing. For example the order of Beam Translator 103 and Beam Deflector 129 can be exchanged. A second set of Risley prisms can be substituted for the Beam Deflector shown in FIG. 1. The gimbal arrangement can be replaced by a tip-tilt (two axis) rotation of a larger translation block 106.

What is claimed is:

1. A 1×N optical switch for coupling an input beam to a selected one of N output fibers comprising:
    a single rough beam deflector for directing the input beam toward the selected output fiber, resulting in a roughly directed beam; and
    a single fine beam deflector for directing the roughly directed beam toward the core of the selected fiber.

2. The switch of claim 1 wherein the rough beam deflector is a translator and the fine beam deflector is an angle adjustor.

3. The switch of claim 1 wherein the rough beam deflector is a an angle adjustor and the fine beam deflector is an angle adjustor.

4. The switch of claim 1 wherein the rough beam deflector is a an angle adjustor and the fine beam deflector is a translator.

5. The switch of claim 1, further including a control system for adjusting the rough beam deflector or the fine beam deflector, the control system comprising:
    a switch for selecting one of the output fibers;
    an adjusting element for adjusting a beam deflector to various positions; and
    a detector for detecting the amount of light transmitted by the selected fiber at various positions.

6. The switch of claim 5, wherein the control system further includes a search routine element for selecting the various positions and a optimizing element for determining an optimum position from among the various positions.

7. The switch of claim 6, further including an initial position element for setting the beam deflector to an initial position based upon the selected output fiber.

8. The switch of claim 1 wherein at least one of the beam deflectors comprises a set of Risley prisms.

9. The switch of claim 1 wherein at least one of the beam deflectors comprises an adjustable liquid prism.

10. The method of selectively switching an input beam of light to one of N output fibers comprising the steps of:
    (a) dynamically deflecting the input beam toward the selected output fiber, resulting in a roughly directed beam; and
    (b) dynamically deflecting the roughly directed beam toward the core of the selected fiber.

11. The method of claim 10 wherein step (a) is accomplished by translating the input beam and step (b) is accomplished by adjusting the angle of the roughly directed beam.

12. The method of claim 10 wherein step (a) is accomplished by adjusting the angle of the input beam and step (b) is accomplished by adjusting the angle of the roughly directed beam.

13. The method of claim 10 wherein step (a) is accomplished by adjusting the angle of the input beam and step (b) is accomplished by translating the roughly directed beam.

14. The method of claim 10, further including the steps of:
    (c) adjusting the deflection applied by one of beam deflecting steps (a) or (b);
    (d) detecting the amount of light appearing at the selected output fiber; and
    (e) repeating steps (c) and (d) several times to determine an acceptable applied deflection according to the amount of light detect in step (d).

15. The method of claim 14, wherein step (e) utilizes a search routine to select deflections applied and further includes the step of determining an optimum applied deflection from among the deflections applied.

16. The method of claim 14, further including, before step (c), the step of setting the applied beam deflection to an initial amount based upon the selected output fiber.

17. The method of claim 10 wherein at least one of the beam deflection steps utilizes a set of Risley prisms.

18. The method of claim 10 wherein at least one of the beam deflection steps utilizes an adjustable liquid prism.

* * * * *